Figure 1:
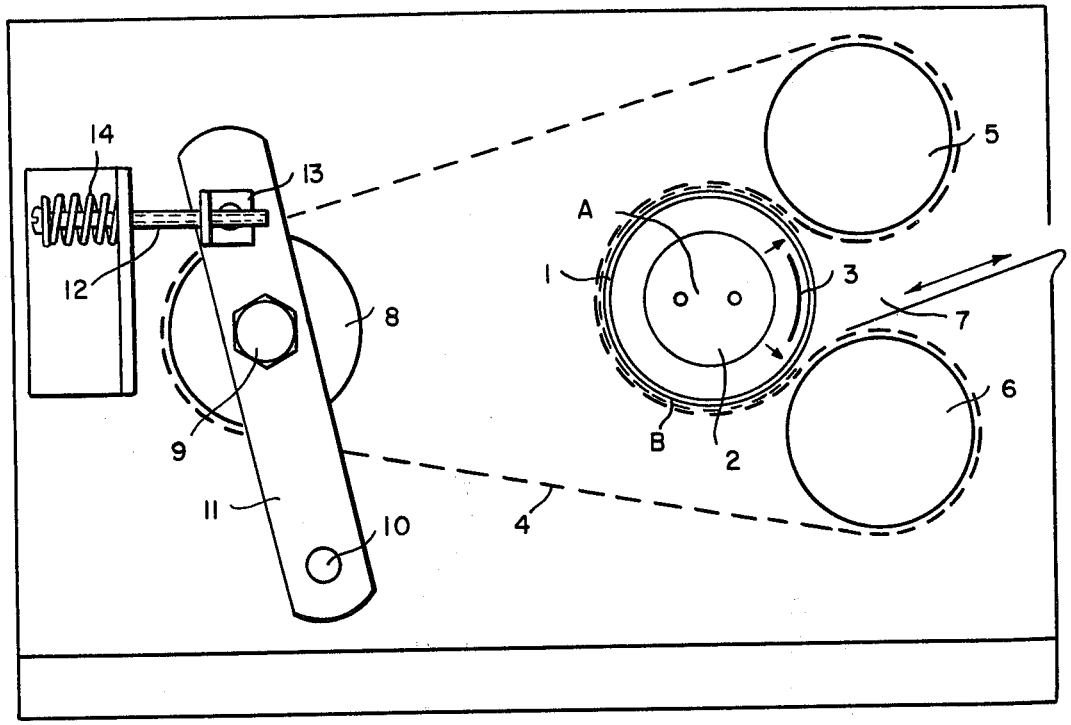

United States Patent [19]

Hans

[11] 4,252,437

[45] Feb. 24, 1981

[54] APPARATUS FOR DUPLICATING MICRO-FILMS

[76] Inventor: Hans Hans, Jahnstr. 2, D-6250 Limburg, Fed. Rep. of Germany

[21] Appl. No.: 32,925

[22] Filed: Apr. 24, 1979

[30] Foreign Application Priority Data

Apr. 24, 1978 [DE] Fed. Rep. of Germany ....... 2812824

[51] Int. Cl.³ .............................................. G03B 27/22
[52] U.S. Cl. .................................................... 355/104
[58] Field of Search ............................... 355/102–105, 355/108, 109, 117, 16

[56] References Cited

U.S. PATENT DOCUMENTS

| | | | |
|---|---|---|---|
| 1,876,442 | 9/1932 | Arni | 355/103 |
| 2,895,395 | 7/1959 | Gern | 355/104 |
| 3,520,604 | 7/1970 | Shelffo | 355/16 |
| 3,639,060 | 2/1972 | Jaskowsky | 355/104 |

FOREIGN PATENT DOCUMENTS

| | | | |
|---|---|---|---|
| 26740 | of 1905 | United Kingdom | 355/109 |
| 483607 | 4/1938 | United Kingdom | 355/104 |

*Primary Examiner*—Donald A. Griffin
*Attorney, Agent, or Firm*—Thompson, Birch, Gauthier & Samuels

[57] ABSTRACT

An apparatus for duplicating micro-films utilizing a cold light tube aligned axially within a transparent cylinder and a conveyor band tensioned by a tension roller and conducted around the transparent cylinder for conveying a superimposed assembly of the original to be copied and the film foil to be exposed into and out of an exposure position while pressing the assembly against the outer surface of the transparent cylinder. The radial distance between the outer surface of the cold light tube and external surface of the transparent cylinder being less than the diameter of the cold light tube. The conveyor band being operated by a reversible drive system employing rotatable chain sprockets.

4 Claims, 2 Drawing Figures

APPARATUS FOR DUPLICATING MICRO-FILMS

The invention relates to an apparatus for duplicating micro-films. On account of the degree of reduction of 40 or more times, the duplication of micro-films requires, apart from a high pressure with which the original to be copied must be pressed upon the film foil to be exposed (25 kg/sq. cm. and above), very powerful light sources in order to keep the exposure times short. In the known apparatuses of this kind flat presser means were usually used and as light sources there were used high-pressure mercury or halogen lamps. The flat presser means, especially in the copying of what are called film jackets, involve difficulties because the webs of the pockets of the jacket intended for the film sections hinder the pressing of the film section surfaces upon the film foil to be copied and frequently moreover air inclusions occur within these pockets likewise hindering the obtaining of satisfactory copies. On account of the long heating times the above-mentioned light sources cannot be switched on and off for each exposure duration, so that a time-controlled shutter device must be arranged between lamp and exposed material. On account of the relatively great generation of heat the lamps moreover must be cooled. The apparatuses therefore require a very great technical expense.

In the photo-copying art so-called cold light tubes have long been used in place of high-pressure mercury lamps, involving the advantage that they can be switched on and off as often as necessary for exposure purposes and also that they generate significantly less heat. Since the light output of these tubes, compared with those of high-pressure mercury lamps and halogen lamps, is lower, these cold light tubes are usually assembled in large numbers into groups, as lighting sources. Such groups of cold light tubes proved unsuitable for use in apparatuses for duplicating micro-films because the halation effect between the surfaces of original and exposed material lying one upon the other, unavoidable when using several light sources, can be tolerated on account of the large scale of the pictures to be copied in photo-copying while with the already mentioned scale of reduction of the micro-films this is not possible and leads to practically unusable copying results.

The invention is based upon the problem, with the aid of cold light tubes, of producing an apparatus for duplicating micro-films which with comparatively adequate to good output involves no halation effect and requires considerably lower production expense in comparison with the known apparatuses. This problem is solved by a cold light tube arranged in the central axis of a glass cylinder and a tensionable conveyor band conducted in a manner known per se around the glass cylinder which conveys the original to be copied and the film foil to be exposed in common into the exposure position and out of it, pressing them against the outer wall of the glass cylinder. As the invention further provides, the radial distance between the outer circumference of the cold light tube and the external diameter of the glass cylinder is here made very small. It can lie below the diameter of the cold light tube, so that for example in a preferred embodiment a diameter ratio of glass cylinder to cold light tube as 50:21 mm. results. The external wall surface of the glass cylinder should be ground to dimension and a thin coating of an elastic material can be applied to the side of the conveyor band facing the glass cylinder. The conveyor band should comprise a reversing drive system which permits of bringing the material for exposure with the original into the exposure position and out of it again by a simple reversing movement.

The glass cylinder with its relatively small diameter and the correspondingly small angle of curvature brings the additional advantage that in the copying of films in film jackets the disadvantageous effect of the webs arranged between the pockets of the jacket practically no longer appears, because the film section to be copied and situated in the pockets is pressed between the webs closely against the copying foil. Moreover in the drawing of the jacket into the gap between conveyor band and glass cylinder, since the webs of the jacket extend transversely of the direction of intake and successively enter the gap, as a result of the mangle action of conveyor band and glass cylinder the air situated in the pockets of the jacket is completely forced out to the side so that no air bubbles can form.

Figure 2:
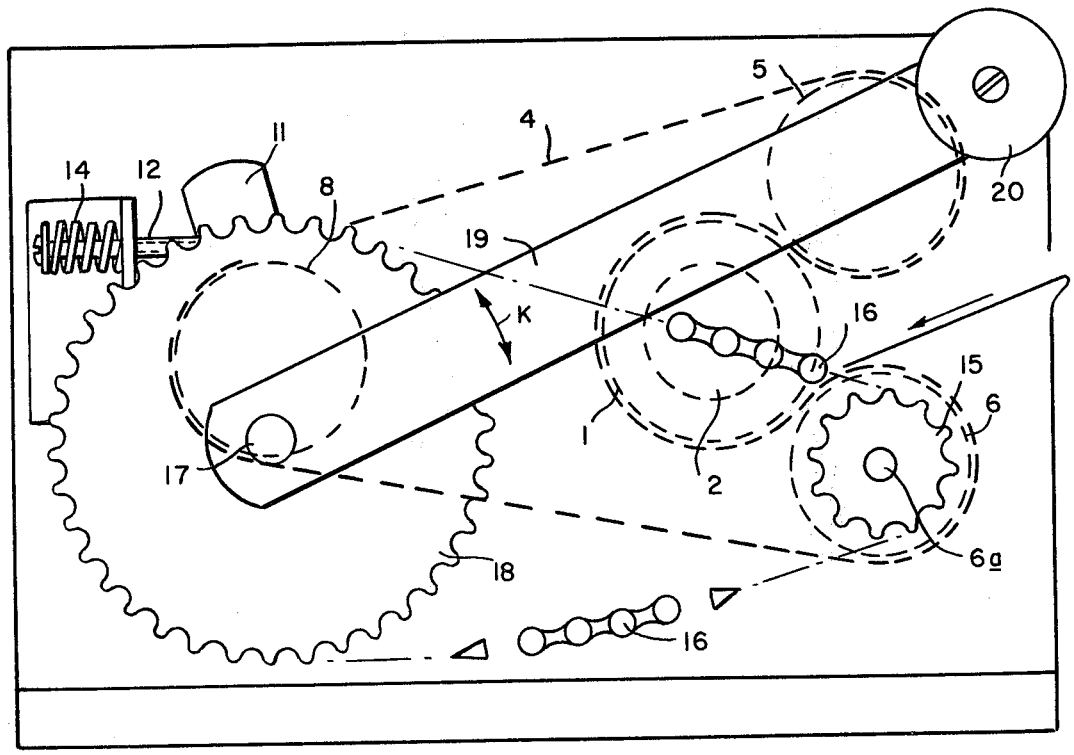

The invention will be explained in greater detail by reference to the example of embodiment illustrated in the drawing, wherein:

FIG. 1 shows the apparatus in diagrammatic representation, with roller guide seen from the side, and FIG. 2 shows the apparatus seen from the drive side, likewise in diagrammatic representation.

The cold light tube 2 is arranged in the central axis A of the glass cylinder 1 and covered within the cylinder 1 in a zone defined by arrows by means of a screen 3. The conveyor band 4, indicated by interrupted lines, is formed as an endless band and conducted with the aid of the reversing roller 5 and the drive roller 6 with an angle of encirclement of about 280° around the glass cylinder 1. The exposure material B, consisting of original and exposure film and indicated by thin interrupted lines, is brought into the position as illustrated and out of it again between the glass cylinder 1 and the drive drum 6 through the entry and exit slot 7 indicated with a double arrow. Behind the glass cylinder in the direction of entry the tensioner roller 8 is mounted at 9 in a pair of single-armed levers 11 articulated at 10. A tension screw 12 screwed into an angle piece 13 engages on the free end of this lever pair 11 and is itself subject to the pressure of a spring 14.

As may be seen from FIG. 2, the drive of the drive roller 6 is effected by means of a chain pinion 15 seated on the roller spindle 6a. The chain 16 conducted around this pinion is conducted as an endless chain around a toothed wheel 18 non-displaceably mounted at 17, with a larger number of teeth. A single-armed lever 19 with an operating knob 20 is seated on the spindle 17 of this toothed wheel.

The exposure material B inserted into the entry and exit slot 7 (FIG. 1) is brought, by single pivoting of the lever 19 (FIG. 2) by hand in the direction of the double arrow K into the exposure position as illustrated in FIG. 1 on the cylinder 1, and after exposure has been effected it is brought back again out of the slot 7 by pivoting back of the lever 19.

I claim:

1. In an apparatus for duplicating micro-films having a cold light tube aligned axially within a transparent cylinder and a conveyor band tensioned by a tension roller and conducted around the transparent cylinder for conveying a superimposed assembly of the original to be copied and the film foil to be exposed into and out of an exposure position while pressing said assembly against the outer surface of the transparent cylinder, the improvement comprising the radial distance between the outer surface of said cold light tube and external surface of the transparent cylinder being less than the diameter of said cold light tube, with said conveyor band being operated by a reversible drive system which includes a first chain sprocket rotatable with a coaxially arranged drive roller contacting said conveyor band, a second chain sprocket having a greater number of teeth than said first chain sprocket, said second chain sprocket being rotatable about an axis parallel to the axis of said first chain sprocket, and means for rotating said second chain sprocket in opposite directions.

2. The apparatus of claim 1 wherein the external diameter of said cold light tube is approximately 21 mm and the external diameter of said glass cylinder is approximately 50 mm.

3. The apparatus of claim 1 wherein said tensioner roller is mounted between a pair of pivotal levers acted upon by spring means.

4. The apparatus for duplicating micro-films, comprising: a cold light tube coaxially arranged within a glass cylinder, a conveyor band conducted in a known manner around the glass cylinder for conveying a superimposed assembly of the original to be copied and the film foil to be exposed into and out of an exposure position pressed against the glass cylinder, said conveyor band being conducted around a tension roller arranged behind the glass cylinder in the direction of introduction of the said assembly, and around a drive roller and idler roller arranged in front of the glass cylinder, said tension roller being mounted between a pair of pivotal levers, the free ends of said levers being acted upon by a spring means for urging said tension roller away from said drive roller and idler roller.

* * * * *